US007992033B2

(12) United States Patent  
Childress et al.

(10) Patent No.: US 7,992,033 B2  
(45) Date of Patent: *Aug. 2, 2011

(54) SYSTEM MANAGEMENT INFRASTRUCTURE FOR CORRECTIVE ACTIONS TO SERVERS WITH SHARED RESOURCES

(75) Inventors: Rhonda L. Childress, Austin, TX (US); Mark Anthony Laney, Round Rock, TX (US); Reid Douglas Minyen, Lakeway, TX (US); Neil Raymond Pennell, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 79 days.

This patent is subject to a terminal disclaimer.

(21) Appl. No.: 12/413,020

(22) Filed: Mar. 27, 2009

(65) Prior Publication Data

US 2009/0183024 A1 Jul. 16, 2009

Related U.S. Application Data

(63) Continuation of application No. 10/418,565, filed on Apr. 17, 2003, now Pat. No. 7,529,981.

(51) Int. Cl.
*G06F 11/00* (2006.01)
(52) U.S. Cl. ........................................................ 714/4.1
(58) Field of Classification Search ................ 714/4, 26, 714/48
See application file for complete search history.

(56) References Cited

U.S. PATENT DOCUMENTS

| | | | |
|---|---|---|---|
| 5,692,120 A | 11/1997 | Forman et al. | |
| 5,797,128 A | 8/1998 | Birnbaum | |
| 5,872,928 A | 2/1999 | Lewis et al. | |
| 5,941,996 A | 8/1999 | Smith et al. | |
| 6,418,468 B1 | 7/2002 | Ahlstrom et al. | |
| 6,449,588 B1 | 9/2002 | Bowman-Amuah | |
| 6,571,285 B1 | 5/2003 | Groath et al. | |
| 6,718,376 B1 | 4/2004 | Chu et al. | |
| 6,718,481 B1 | 4/2004 | Fair | |
| 6,829,639 B1 | 12/2004 | Lawson et al. | |
| 6,845,474 B2 | 1/2005 | Circenis et al. | |
| 7,529,981 B2 | 5/2009 | Childress et al. | |
| 2002/0107743 A1 | 8/2002 | Sagawa | |
| 2003/0005107 A1 | 1/2003 | Dulberg et al. | |
| 2003/0023719 A1 | 1/2003 | Castelli et al. | |
| 2003/0046396 A1 | 3/2003 | Richter et al. | |
| 2006/0117212 A1 | 6/2006 | Meyer et al. | |

OTHER PUBLICATIONS

"Managing Application Services over Service Provider Networks: Architecture and Dependency Analysis", G.Kar, A. Keller, S. Calo, IEEE Conference Proceedings Article, Apr. 10, 2000, pp. 61-74. cited by other.
USPTO; examination correspondence from related U.S. Appl. No. 10/418,565, filed Apr. 27, 2003, by Rhonda Childress, et al., now issued as U.S. patent 7,529,981.
PCT; International Search Report from related international patent application PCT/GB2004/001664, fi iiled on Apr. 16, 2004.

*Primary Examiner* — Michael C Maskulinski
(74) *Attorney, Agent, or Firm* — Robert H. Frantz; David A. Mims, Jr.; Mark C. Vallone

(57) ABSTRACT

Corrective actions are managed for differing preferences among multiple sharing customers by a repository inquirer which, responsive to receipt of a fault event or out-of-limits condition for a shared resource of a first computing system domain, queries a customer requirements repository, determines affected application programs for the customers sharing the resource, determines affected customers on behalf of which affected application programs are being executed, and by a preference extractor which, responsive to the inquirer, extracts preferences for each affected application programs; and a corrective action instigator which, responsive to the extractor, performs two or more corrective actions according to the extracted preferences, wherein the corrective actions comprise at least two different actions, and wherein at least one corrective action comprises moving execution of an application program from a first computing system to a second computing system.

18 Claims, 5 Drawing Sheets

SYSTEM MANAGEMENT INFRASTRUCTURE FOR CORRECTIVE ACTIONS TO SERVERS WITH SHARED RESOURCES

CROSS-REFERENCE TO RELATED APPLICATIONS

Claiming Benefit Under 35 U.S.C. 120

This is a continuation application of U.S. patent application Ser. No. 10/418,565, filed on Apr. 17, 2003 now U.S. Pat No. 7,529,981.

FEDERALLY SPONSORED RESEARCH AND DEVELOPMENT STATEMENT

This invention was not developed in conjunction with any Federally sponsored contract.

MICROFICHE APPENDIX

Not applicable.

INCORPORATION BY REFERENCE

The related U.S. patent application Ser. No. 10/418,565, filed on Apr. 17, 2003, is incorporated by reference herein.

BACKGROUND OF THE INVENTION

1. Field of the Invention

This is a continuation application of U.S. patent application Ser. No. 10/418,565, filed on Apr. 17, 2003. This invention relates to technologies for controlling and automating corrective actions for computer systems, business application programs, and their resources.

2. Background of the Invention

Currently, most computer system management products are designed to handle a single customer's requirements under the assumption that only one customer is using all of the resources employed by the application program(s). In such a traditional arrangement, a computer processor unit or "CPU", the memory it employs, and the persistent storage it uses (e.g. hard disk drives), are all dedicated to a single customer's usage.

As such, that customer's corrective action requirements may be fairly simply automated. Turning to FIG. 1, the general process (10) of existing computer system management products is shown, in which an analysis process is started (11) each time a fault (12) or other out-of-limit condition is detected. This may be a limit to take a corrective action when a hard drive unit is 90% full, for example.

An event management system usually queries (13) a single set of rules (16) for that customer to determine how to handle the event or condition. For example, in a particular customer's system, a nearly full hard drive unit may be a critical situation for a data intensive application, and as such, the appropriate action may be to send multiple alerts by pager, email, and printed report to support staff so that additional hard disk resources may be allocated or installed. In a different customer's application and system which is less dependent on hard drive storage, the condition may be less critical, and the rule may indicate to send a low-priority status or warning message by email to a service engineer.

So, based on these single-customer rules, the event management system (14) takes appropriate actions, thereby completing (15) the processing of the fault or condition. This creates a "one-size-fits-all" fault and out-of-limit condition handling process for the entire system and it's resources, assuming that a single customer or client is using all of those resources.

However, a business conditions have evolved recently, it has been found that deploying multiple infrastructures (e.g. multiple sets of resources) to support small or medium business is not cost effective. It has become desirable for some systems and service providers such as International Business Machines ("IBM") to "host" multiple application programs for multiple customers on a set of shared resources. For example, a system may have a single processor unit, a single bank of RAM memory, and 2 hard drive units. Three customers' applications may be run simultaneously on this set of resources, with a first customer application using the first hard drive, and the second and third customers' applications using (e.g. sharing) the second hard drive. In this manner, a system or resource provider can share an infrastructure amongst multiple customers, thereby minimizing cost associated with unused (e.g. spare) resources, maintenance expenses due to duplicate hardware installations, etc.

System management professionals, however, are only provided with the traditional tools of "one-size-fits-all" (e.g. single-customer action response rule set) for taking corrective action on a server, and to alert a customer if a server has reached a certain percentage utilized or other actionable condition. As such, currently available system management tools and technologies are not currently capable of taking different actions for different customers if the customers share a single resource, and thus do not support the newer business requirements to host multiple customer applications on multiple shared resources, especially in situations wherein the thresholds, limits, and response actions for such multiple customers vary from customer to customer.

This further limits the ability of the service provider or hosting company to offer different levels of service, presumably for different fee or cost structures, when the applications are to be implemented or "run" on shared resources. For example, one client could not be offered a less expensive support plan which does not include any weekend or evening escalation responses, while another client is offered a support plan which provides immediate responses even during "premium" hours.

Therefor, there is a need in the art for a system and method which readily supports taking corrective action for conditions and faults detected in computing system infrastructures hosting multiple customer applications and sharing multiple resources, in which the corrective action rules are configurable and adjustable for each customer's requirements and are decoupled from a universal response scheme associated solely with each shared resource.

BRIEF DESCRIPTION OF THE DRAWINGS

The following detailed description when taken in conjunction with the figures presented herein provide a complete disclosure of the invention.

SUMMARY OF THE INVENTION

Figure 1:
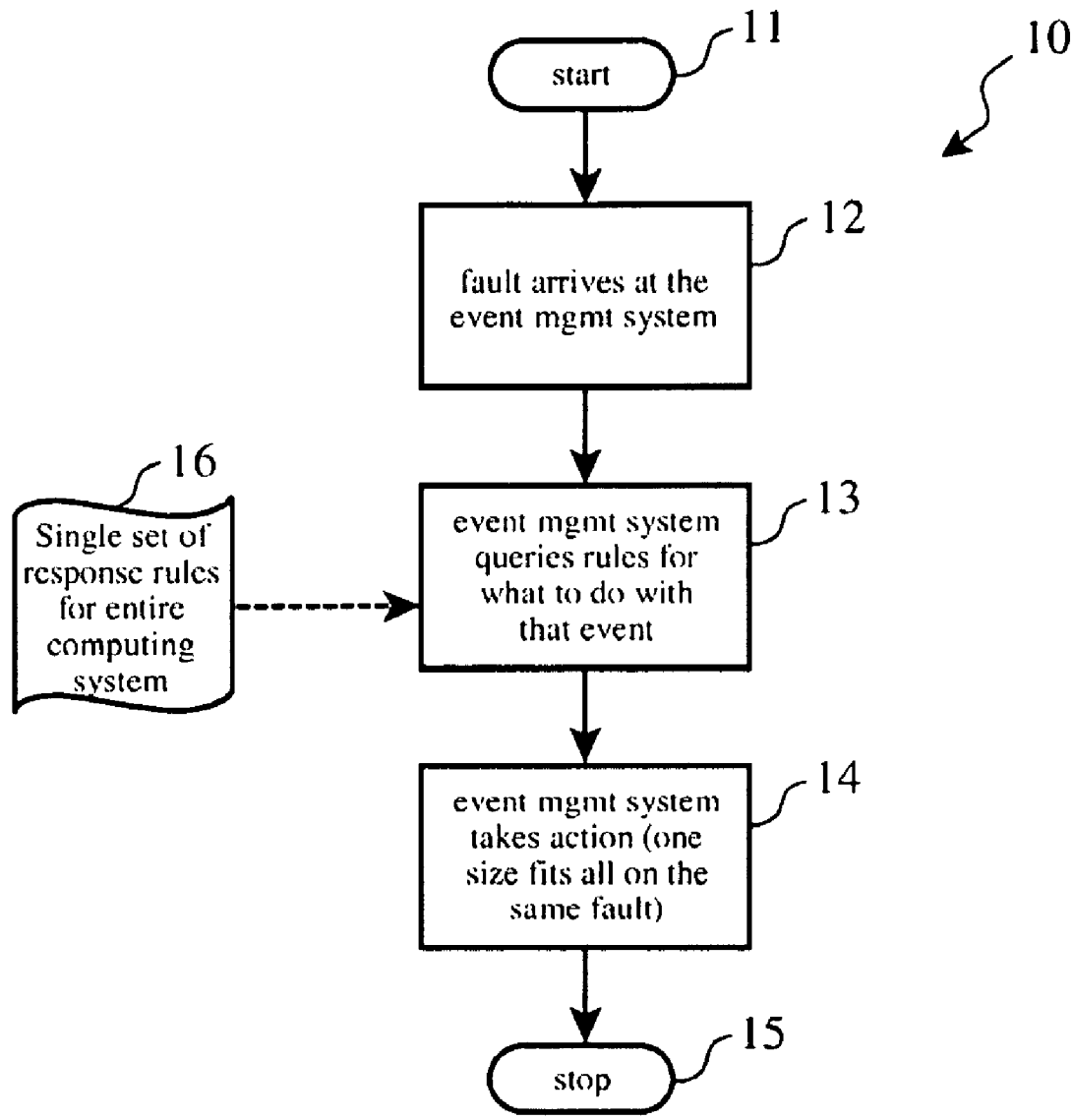
FIG. 1 shows the typical method of handling service events in a single-customer computing infrastructure.

Corrective actions are managed for differing preferences among multiple sharing customers by a repository inquirer which, responsive to receipt of a fault event or out-of-limits condition for a shared resource of a first computing system domain, queries a customer requirements repository, determines affected application programs for the customers sharing the resource, determines affected customers on behalf of which affected application programs are being executed, and by a preference extractor which, responsive to the inquirer, extracts preferences for each affected application programs; and a corrective action instigator which, responsive to the extractor, performs two or more corrective actions according to the extracted preferences, wherein the corrective actions comprise at least two different actions, and wherein at least one corrective action comprises moving execution of an application program from a first computing system to a second computing system.

DESCRIPTION OF THE INVENTION

Embodiments of the present invention provide a new system management tool which introduces customer logic (e.q. business logic) into the event management process which queries database that contains information indicating what action(s) should be taken for each event or condition in association with each customer and the troubled shared resource. This allows for implementation of custom or tailored service plans for each customer, even though the customers' application programs are co-hosted on the same set of shared computing resources. As such, embodiments of the present invention enable a number of benefits to be realized, including, but not limited to, supporting tailored service plans for multiple customers whose applications are hosted on a set of shared resources, taking automatic provisioning ("autoprovisioning") actions such as allocating additional disk space to an application, provisioning a new server for an application, etc., as well as implementation and realization of enhanced business models which support fees and charge reconciliation based upon contractual relationships between customers and providers regardless of application hosting and resource sharing actualities. Embodiments according to the present invention employ a Service Level Agreement (SLA) database that contains information (e.g. rules) regarding each customers response requirements, and the business logic to appropriately respond to each condition or fault according to these rules. For example, Customer A may receive an email if a disk drive has reached 90%, while Customer B, whose application shares use of the same disk drive, may get a higher-priority trouble ticket.

By querying the database and extracting out the SLA information associated with each customer for the appropriate action to take, a provider company or enterprise can share the customer machines and the infrastructure used to monitor the machines, and still meet a "customized" service solution for the various customers.

Figure 2:
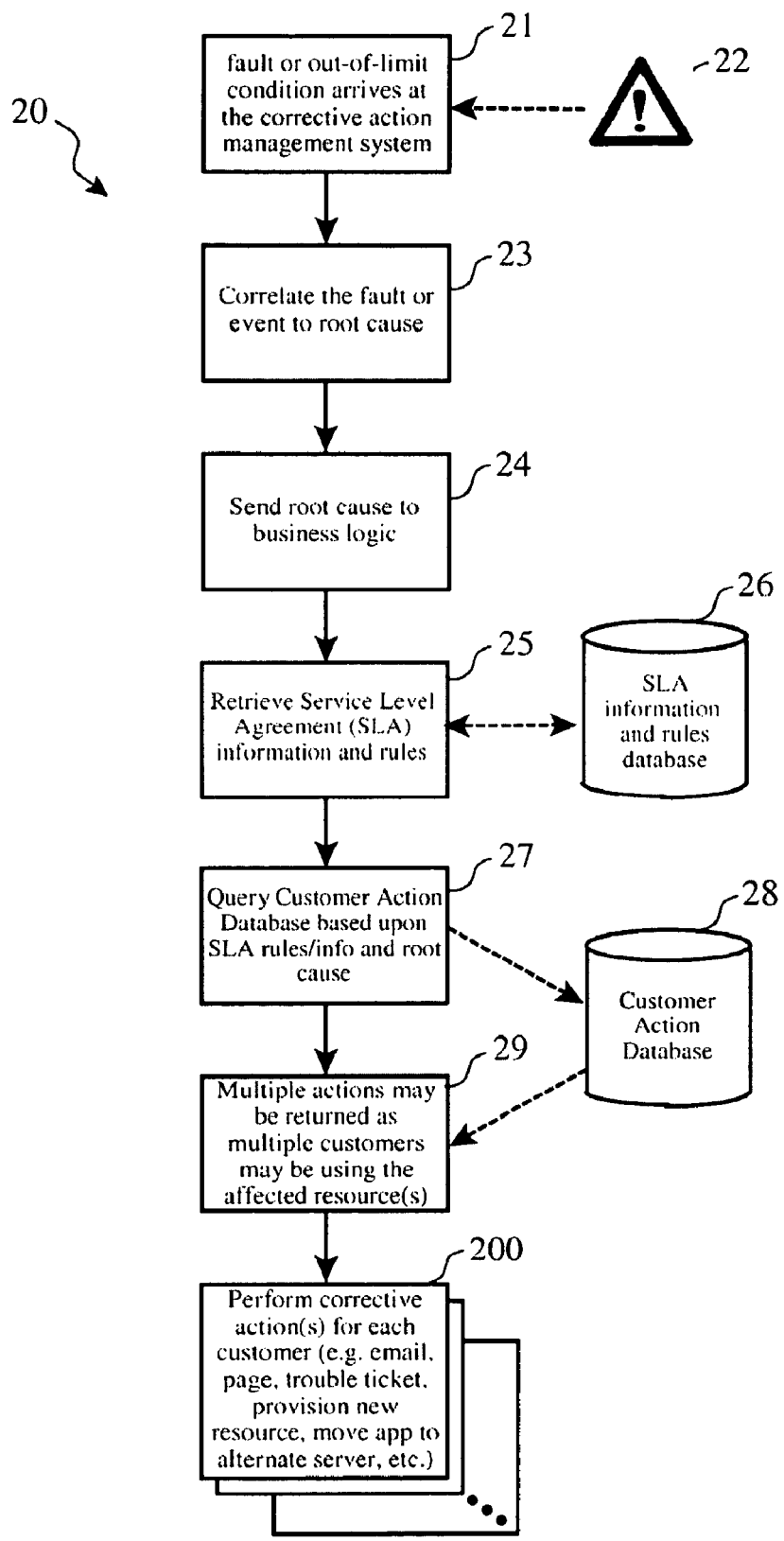
FIG. 2 illustrates the introduction of a database containing information regarding each customer's response requirements, and the business logic appropriately respond to each condition or fault according to these rules.

FIG. 2 illustrates the logical process (20) of our corrective action method. The method (20) starts when an event, failure detection, or out-of-limits condition (22) is detected or reported by a shared resource and received (21) by a system running our logical process. The fault or out-of-limits condition is then correlated (23) to a root cause, such as a nearly-full hard drive or an over-taxed microprocessor, using traditional root cause analysis products or methods. This root cause is then transferred (24) to the business logic for the Service Level Agreement and corrective action implementation.

The database of customer response rules (26) is then queried (25) to determine:
 (a) which applications running on the computing platform use the shared resource,
 (b) which customers own those affected applications;
 (c) and what is the preferred reaction or correction for each customer to the fault or out-of-limit condition (22).

Following identification of the affected applications and customers, and the extraction of the preferred corrective action for each customer, a customer action database (28) is queried (27) based upon these factors to determine exactly what actions to take. This may return (29) multiple corrective actions to be implemented for multiple actions, as each fault or out-of-limits condition may relate to a system resource which is shared by multiple applications which are, in turn, owned by multiple customers.

Those corrective actions are then implemented or executed (200) for each customer. Notification actions may include, but are not limited to:
 (a) sending a notification email to a designated contact;
 (b) sending a pager message to a designated contact;
 (c) logging the event or condition to an event log;
 (d) printing a report; and
 (e) opening a trouble ticket.

Autoprovisioning or corrective actions may include, but are not limited to:
 (f) provisioning a new resource for use by an application such as an alternate hard drive for storage or alternate port for communications;
 (g) increasing or decreasing allocated storage limits such as hard drive space or RAM space;
 (h) increasing or decreasing an application's priority on a particular processor;
 (i) adding or deleting a virtual machine for use by an applications;
 (j) adding/enabling or uninstalling/disabling a software product; and
 (k) moving and application from one server to another server.

Notifications may be as simple as printing a report, sending a message to a pager, or sending an email. Problem tickets may include orders for repairs, orders for hardware and/or software upgrades, and the like. Automatic corrections may include actions such as allocating additional memory to an application, allocating space on another hard drive, switching use to another hard drive (e.g. a mirrored backup drive), etc.

Optionally, changes in usage such as allocation of additional memory, hard drive space, or use of a backup resource, can be recorded in a usage tracking database. From these changes in usage, each customer's charges may be reconciled according to usage and expense rules for each customer, resulting in customized billing and cost plans for each customer. For example, one customer may pay a monthly fee to exceed their allocated disk space by up to 25% without additional charge, while another customer may have a usage plan which incurs a per-megabyte or per-terabyte charges when exceeding a pre-purchased storage amount. A third customer, however, may simply be notified of the memory shortage and offered an upgrade for a fee.

According to another feature of our new method and system for automatically taking corrective action for shared resources according to multiple customer Service Level Agreements, one or more applications may be automatically moved from one server to another according to each customer's SLA and to the availability or "inventory" of servers and systems.

Figure 5:
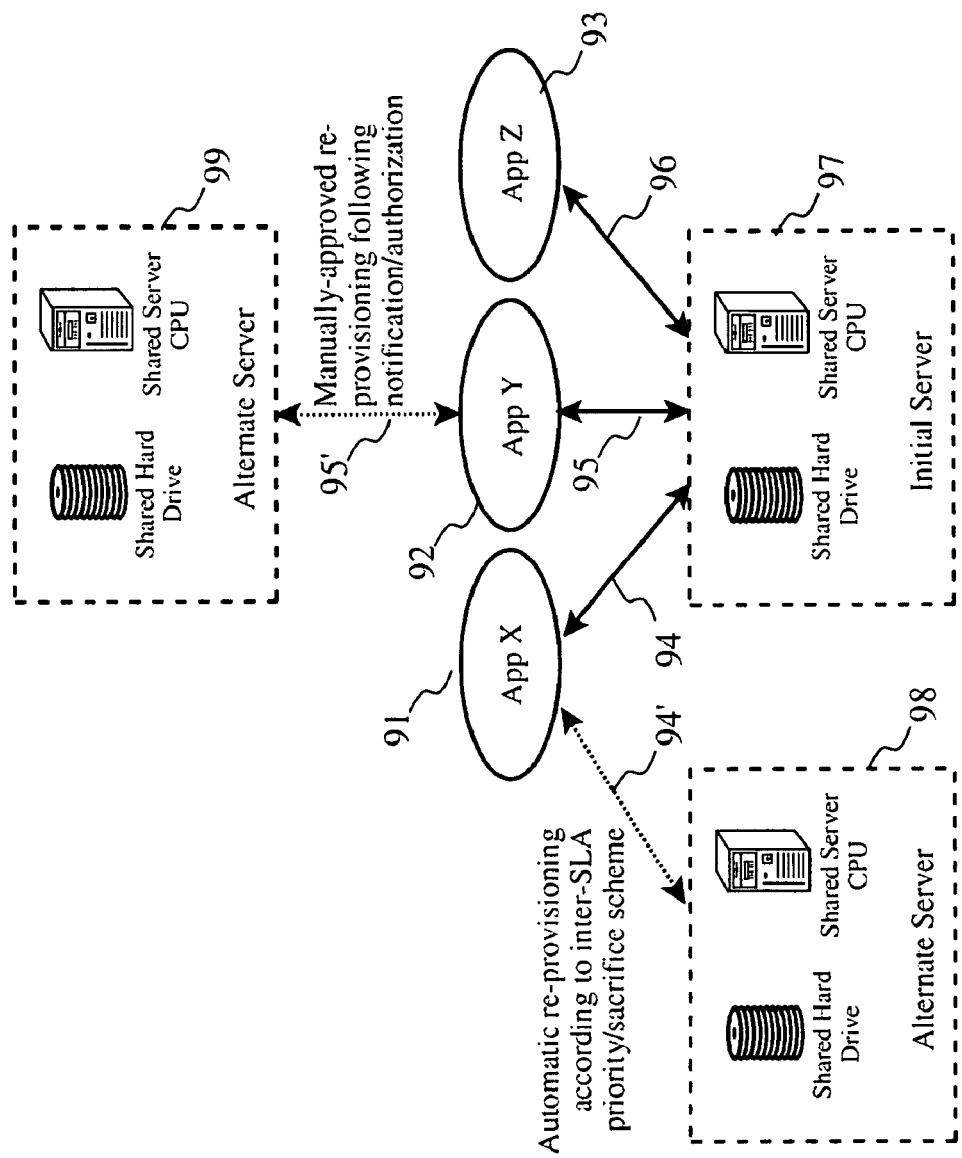
FIG. 5 shows an advanced and optional aspect of the present invention whereby certain corrective actions may be implemented according to business and/or technical priorities with respect to the various SLA's of the sharing customers.

For example, as shown in FIG. 5, assume a shared hard drive reaches 90% of its capacity in an initial server (97) running (94, 95, 96) three different applications X (91), Y (92), and Z (93), wherein these three applications belong to three different customers A, B, and C (not shown). Also assume, for this example, that all three applications X, Y, and Z significantly utilize the shared hard drive. Further assume that no additional hard drives are available on the initial server system (97) where X, Y, and Z are currently running.

If customer A, who owns application X, has contracted with the server (97) owner (not shown) for automatic application relocation (e.g. for a premium maintenance or support fee), and customers B and C have not arranged for such relocation, then another instance of application X may be started on the first available alternate server (98). Traffic or transactions may be transferred (94') to the alternate server (98) in a graceful manner allowing the initial instance of application X to eventually be de-provisioned from the first server (97).

This automatic action would allow customer A's application to be automatically moved to an application server where adequate resources are available, while leaving customer B's application and customer C's application running on the first server.

Further assume that customer B's application Y (92) is subject to an SLA which indicates such a "nearly full disk" condition should result in an immediate pager message to the customer B's information technology contact or representative. The pager message is sent, and applications Y and Z continue to run under the degraded conditions until the representative from customer B authorizes a corrective action (e.g. relocation of the application to another server), perhaps for an agreed-upon fee or revenue amount, to move application Y (92) to run (95') on an alternate server (99).

As such, our new corrective action method can determine or select which applications will be serviced in a priority based upon the SLA's of the customer's relative to each other. For example, if all the needed resources are not available to satisfy all the preferred corrective actions of all the affected customers, some corrective actions may be deferred or foregone for customers whose SLA does not provide for revenue or cost reimbursement to the system owner for the corrective action. This allows system resources to be managed in a manner which assures or maximizes business revenue according to the SLA's for all of the customers who share the affected computing resources, thereby allowing the computing system (or server) owner to realize an advantageous business model and method.

Computing Platforms

The present invention is preferably realized as software-embodied methods and mechanisms executed by one or more suitable computing platform(s). As such, it is useful to review computing platforms in general. Currently, computing platforms which are utilized as server systems are typically personal computers, specialized workstations, or Enterprise-server class machines.

It is foreseeable, however, that as capabilities of portable and handheld computing systems continue to increase in processing power, communications bandwidth, and memory capacity, these types of computing platforms may also be suitable for certain implementations of the present invention. These common computing platforms can include "palm-top" personal computers as well as portable computing platforms, such as personal digital assistants ("PDA"), web-enabled wireless telephones, and other types of personal information management ("PIM") devices.

Therefore, it is useful to review a generalized architecture of a computing platform which may span the range of implementation, from a high-end web or enterprise server platform, to a personal computer, to a portable PDA or web-enabled wireless phone.

Figure 3:
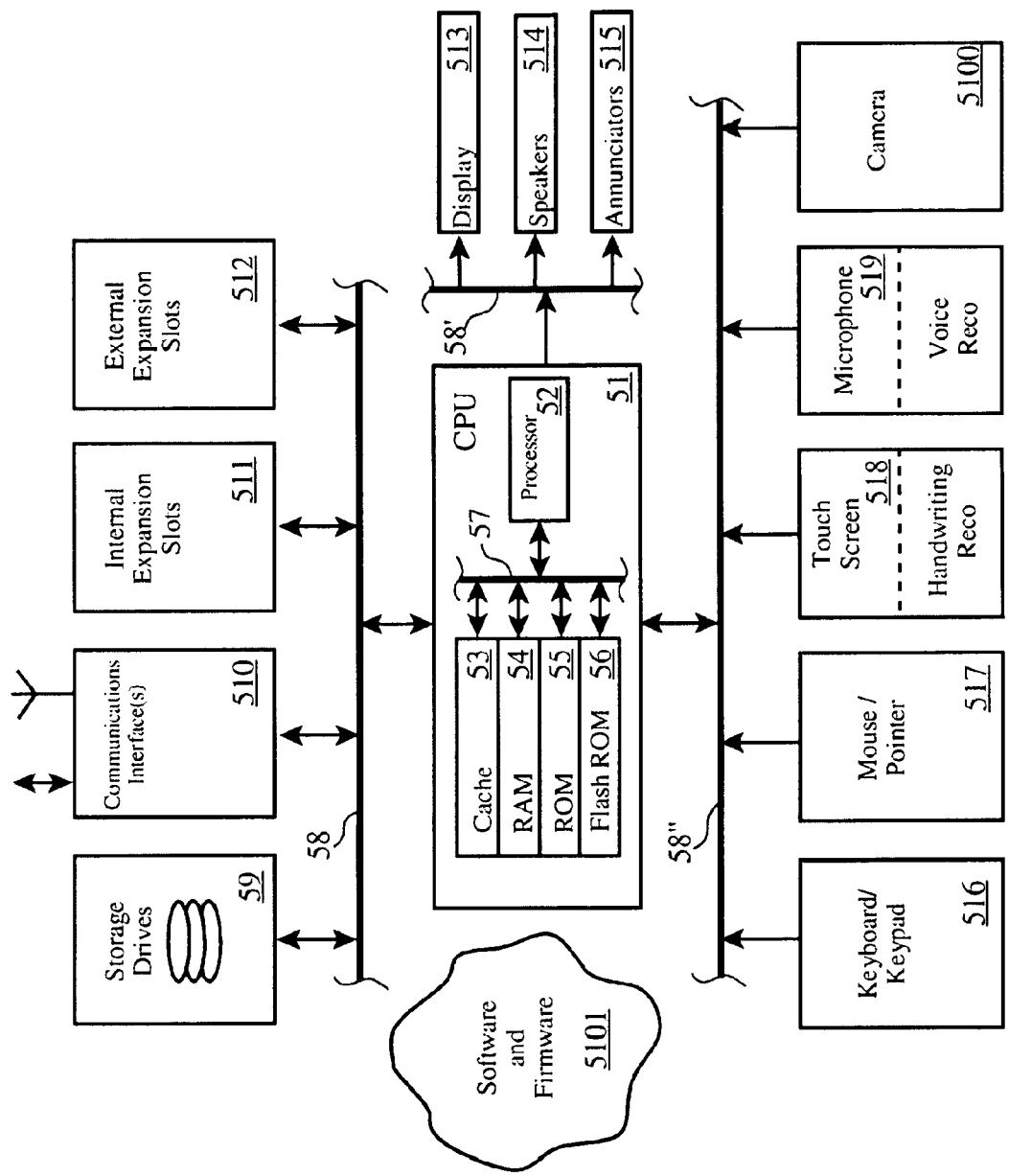
FIG. 3 depicts a generalized computing platform architecture, such as a personal computer, server computer, personal digital assistant, web-enabled wireless telephone, or other processor-based device, suitable for inclusion in embodiments of the present invention.

Turning to FIG. 3, a generalized architecture is presented including a central processing unit (51) ("CPU"), which is typically comprised of a microprocessor (52) associated with random access memory ("RAM") (54) and read-only memory ("ROM") (55). Often, the CPU (51) is also provided with cache memory (53) and programmable FlashROM (56). The interface (57) between the microprocessor (52) and the various types of CPU memory is often referred to as a "local bus", but also may be a more generic or industry standard bus.

Many computing platforms are also provided with one or more storage drives (59), such as a hard-disk drives ("HDD"), floppy disk drives, compact disc drives (CD, CD-R, CD-RW, DVD, DVD-R, etc.), and proprietary disk and tape drives (e.g., Iomega Zip™ and Jaz™, Addonics SuperDisk™, etc.). Additionally, some storage drives may be accessible over a computer network.

Many computing platforms are provided with one or more communication interfaces (510), according to the function intended of the computing platform. For example, a personal computer is often provided with a high speed serial port (RS-232, RS-422, etc.), an enhanced parallel port ("EPP"), and one or more universal serial bus ("USB") ports. The computing platform may also be provided with a local area network ("LAN") interface, such as an Ethernet card, and other high-speed interfaces such as the High Performance Serial Bus IEEE-1394.

Computing platforms such as wireless telephones and wireless networked PDA's may also be provided with a radio frequency ("RF") interface with antenna, as well. In some cases, the computing platform may be provided with an infrared data arrangement (IrDA) interface, too.

Computing platforms are often equipped with one or more internal expansion slots (511), such as Industry Standard Architecture (ISA), Enhanced Industry Standard Architecture (EISA), Peripheral Component Interconnect (PCI), or proprietary interface slots for the addition of other hardware, such as sound cards, memory boards, and graphics accelerators.

Additionally, many units, such as laptop computers and PDA's, are provided with one or more external expansion slots (512) allowing the user the ability to easily install and remove hardware expansion devices, such as PCMCIA cards, SmartMedia cards, and various proprietary modules such as removable hard drives, CD drives, and floppy drives.

Often, the storage drives (59), communication interfaces (510), internal expansion slots (511) and external expansion slots (512) are interconnected with the CPU (51) via a standard or industry open bus architecture (58), such as ISA, EISA, or PCI. In many cases, the bus (58) may be of a proprietary design.

A computing platform is usually provided with one or more user input devices, such as a keyboard or a keypad (516), and mouse or pointer device (517), and/or a touch-screen display (518). In the case of a personal computer, a full size keyboard is often provided along with a mouse or pointer device, such as a track ball or TrackPoint™. In the case of a web-enabled wireless telephone, a simple keypad may be provided with one or more function-specific keys. In the case of a PDA, a touch-screen (518) is usually provided, often with handwriting recognition capabilities.

Additionally, a microphone (519), such as the microphone of a web-enabled wireless telephone or the microphone of a personal computer, is supplied with the computing platform. This microphone may be used for simply reporting audio and voice signals, and it may also be used for entering user choices, such as voice navigation of web sites or auto-dialing telephone numbers, using voice recognition capabilities.

Many computing platforms are also equipped with a camera device (5100), such as a still digital camera or full motion video digital camera.

One or more user output devices, such as a display (513), are also provided with most computing platforms. The display (513) may take many forms, including a Cathode Ray Tube ("CRT"), a Thin Flat Transistor ("TFT") array, or a simple set of light emitting diodes ("LED") or liquid crystal display ("LCD") indicators.

One or more speakers (514) and/or annunciators (515) are often associated with computing platforms, too. The speakers (514) may be used to reproduce audio and music, such as the speaker of a wireless telephone or the speakers of a personal computer. Annunciators (515) may take the form of simple beep emitters or buzzers, commonly found on certain devices such as PDAs and PIMs.

These user input and output devices may be directly interconnected (58', 58") to the CPU (51) via a proprietary bus structure and/or interfaces, or they may be interconnected through one or more industry open buses such as ISA, EISA, PCI, etc.

The computing platform is also provided with one or more software and firmware (5101) programs to implement the desired functionality of the computing platforms.

Figure 4:
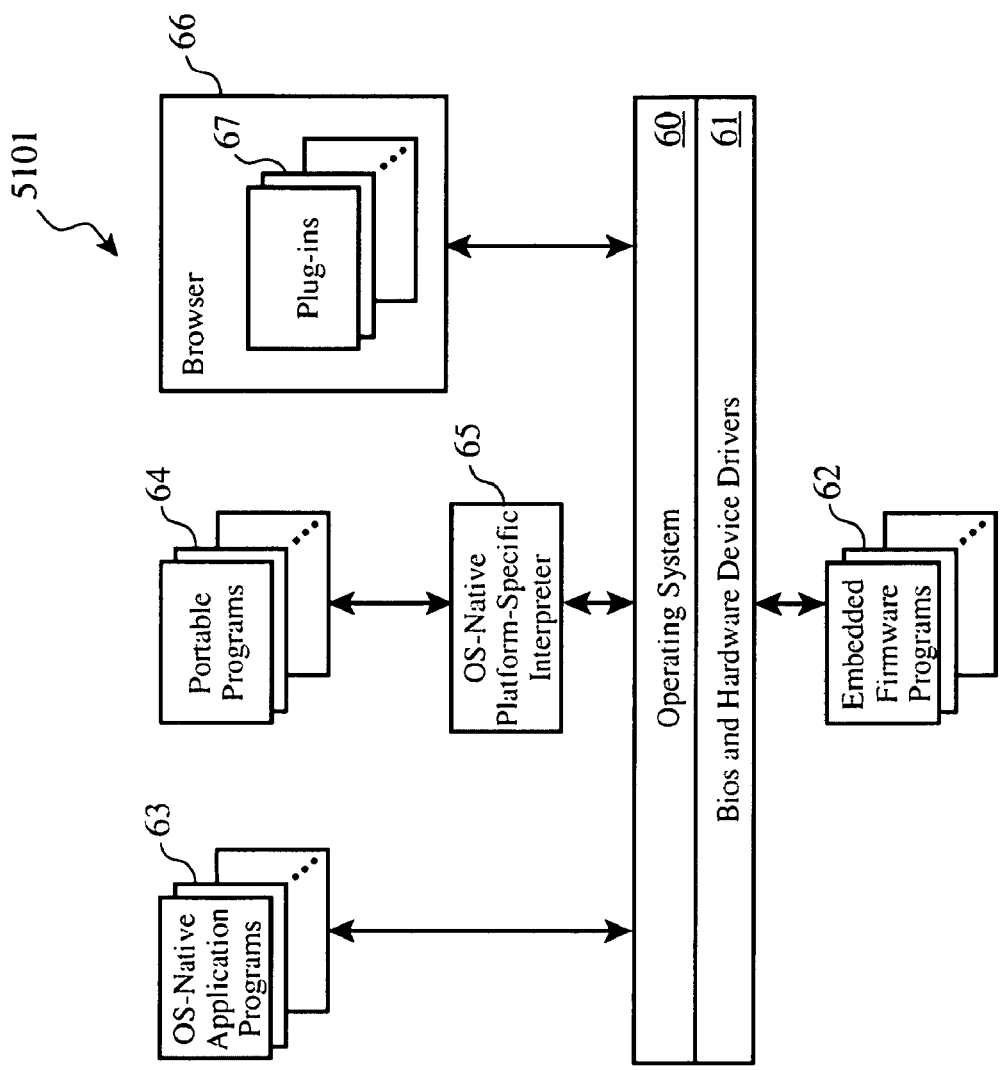
FIG. 4 shows a generalized organization of software and firmware associated with the generalized architecture of FIG. 5.

Turning to now FIG. 4, more detail is given of a generalized organization of software and firmware (5101) on this range of computing platforms. One or more operating system ("OS") native application programs (63) may be provided on the computing platform, such as word processors, spreadsheets, contact management utilities, address book, calendar, email client, presentation, financial and bookkeeping programs.

Additionally, one or more "portable" or device-independent programs (64) may be provided, which must be interpreted by an OS-native platform-specific interpreter (65), such as Java™ scripts and programs.

Often, computing platforms are also provided with a form of web browser or micro-browser (66), which may also include one or more extensions to the browser such as browser plug-ins (67).

The computing device is often provided with an operating system (60), such as Microsoft Windows™, UNIX, IBM OS/2™, LINUX, MAC OS™ or other platform specific operating systems. Smaller devices such as PDA's and wireless telephones may be equipped with other forms of operating systems such as real-time operating systems ("RTOS") or Palm Computing's PalmOS™.

A set of basic input and output functions ("BIOS") and hardware device drivers (61) are often provided to allow the operating system (60) and programs to interface to and control the specific hardware functions provided with the computing platform.

Additionally, one or more embedded firmware programs (62) are commonly provided with many computing platforms, which are executed by onboard or "embedded" microprocessors as part of the peripheral device, such as a micro controller or a hard drive, a communication processor, network interface card, or sound or graphics card.

As such, FIGS. 3 and 4 describe in a general sense the various hardware components, software and firmware programs of a wide variety of computing platforms, including but not limited to personal computers, PDAs, PIMs, web-enabled telephones, and other appliances such as WebTV™ units.

Conclusion

The present invention has been disclosed both as a method which may be realized or practiced through combinations of software and hardware implementations, and specific embodiment examples have been provided. It will be recognized by those skilled that the scope of the present invention is not limited to the specific embodiment details provided herein, and that certain variations or alternate embodiments may be employed without departing from the spirit and scope of the present invention, including but not limited to use of alternate computing platforms, distribution of functionality among different computing platforms, and use of alternate programming languages or methodologies. Therefore, the scope of the present invention should be determined by the following claims.

What is claimed is:

1. A system comprising:
   a customer requirements repository in a computer memory portion of a computing platform, containing corrective action preferences for each of a plurality customers sharing a first computing system to execute one or more application programs on behalf of each of said customers, wherein said corrective action preferences differ among said customers;
   a repository inquirer portion of a computing platform, responsive to receipt of a fault event or out-of-limits condition for a shared resource of said first computing system domain:
      querying said customer requirements repository,
      determining two or more affected application programs for two or more customers sharing said shared resource,
      determining affected customers on behalf of which said affected application programs are being executed;
   a preference extractor portion of a computing platform, responsive to said repository inquirer, extracting from said repository corrective action preferences for each of said affected application programs; and
   a corrective action instigator portion of a computing platform, responsive to said preference extractor, performing two or more corrective actions according to said extracted preferences, wherein said corrective actions comprise at least two different actions, and wherein at least one corrective action comprises moving execution of an application program from said first computing system to a second computing system.

2. The system as set forth in claim 1 wherein said customer requirements repository comprises a database.

3. The system as set forth in claim 1 wherein said corrective action preferences comprise a set of rules disposed for evaluation during extracting corrective action preferences.

4. The system as set forth in claim 1 wherein said corrective action instigator sends an electronic mail message.

5. The system as set forth in claim 1 wherein said corrective action instigator sends a pager message.

6. The system as set forth in claim 1 wherein said corrective action instigator opens a problem ticket.

7. The system as set forth in claim 1 wherein said corrective action instigator generates a trouble report.

8. The system as set forth in claim 1 wherein said corrective action instigator performs an action selected from the group comprising scheduling an upgrade to a computing platform resource, scheduling a repair to a computing platform resource, and scheduling an upgrade to a computing platform software component.

9. The system as set forth in claim 1 wherein said received fault event or out-of-limits condition comprises receiving a notice selected from the group of an event associated with a processor bandwidth utilization maximum limit, an event associated with a memory utilization maximum limit, an event associated with a communication link bandwidth utilization maximum limit, an event associated with a persistent storage utilization maximum limit, and an event associated with a delay of service maximum limit.

10. A computer readable memory comprising:
   a computer readable memory suitable for encoding software programs; and
   one or more software programs encoded by said computer readable memory, when executed, causing a processor to:
      provide a customer requirements repository in a computer memory portion of a computing platform, containing corrective action preferences for each of a plurality customers sharing a first computing system to execute one or more application programs on behalf of each of said customers, wherein said corrective action preferences differ among said customers;
      responsive to receipt of a fault event or out-of-limits condition for a shared resource of said first computing system domain:
         query said customer requirements repository,
         determine two or more affected application programs for two or more customers sharing said shared resource,
         determine affected customers on behalf of which said affected application programs are being executed;
         extract from said repository corrective action preferences for each of said affected application programs; and
         responsive to said preference extractor, performing two or more corrective actions according to said extracted preferences, wherein said corrective actions comprise at least two different actions, and wherein at least one corrective action comprises moving execution of an application program from said first computing system to a second computing system.

11. The computer readable memory as set forth in claim 10 wherein said customer requirements repository comprises a database.

12. The computer readable memory as set forth in claim 10 wherein said corrective action preferences comprise a set of rules disposed for evaluation during extracting corrective action preferences.

13. The computer readable memory as set forth in claim 10 wherein said corrective action comprises sending an electronic mail message.

14. The computer readable memory as set forth in claim 10 wherein said corrective action comprises sending a pager message.

15. The computer readable memory as set forth in claim 10 wherein said corrective action comprises opening a problem ticket.

16. The computer readable memory as set forth in claim 10 wherein said corrective action comprises generating a trouble report.

17. The computer readable memory as set forth in claim 10 wherein said corrective action comprises performing an action selected from the group comprising scheduling an upgrade to a computing platform resource, scheduling a repair to a computing platform resource, and scheduling an upgrade to a computing platform software component.

18. The computer readable memory as set forth in claim 10 wherein said received fault event or out-of-limits condition comprises receiving a notice selected from the group of an event associated with a processor bandwidth utilization maximum limit, an event associated with a memory utilization maximum limit, an event associated with a communication link bandwidth utilization maximum limit, an event associated with a persistent storage utilization maximum limit, and an event associated with a delay of service maximum limit.

* * * * *